United States Patent
Baltaji et al.

(10) Patent No.: US 10,232,552 B2
(45) Date of Patent: Mar. 19, 2019

(54) METHOD FOR THREE DIMENSIONAL PRINTING

(71) Applicant: DSCALES, LLC, Dover, DE (US)

(72) Inventors: Omar Baltaji, Beirut (LB); Moustafa Mohamed Hassan Eid, Beirut (LB)

(73) Assignee: DSCALES, LLC, Dover, DE (US)

( * ) Notice: Subject to any disclaimer, the term of this patent is extended or adjusted under 35 U.S.C. 154(b) by 0 days.

(21) Appl. No.: 16/015,600

(22) Filed: Jun. 22, 2018

(65) Prior Publication Data

US 2018/0297281 A1 Oct. 18, 2018

Related U.S. Application Data

(63) Continuation of application No. PCT/US2017/060127, filed on Dec. 21, 2017.
(Continued)

(51) Int. Cl.
  *B29C 41/02* (2006.01)
  *B29C 64/245* (2017.01)
  (Continued)

(52) U.S. Cl.
  CPC .......... *B29C 64/245* (2017.08); *B29C 64/124* (2017.08); *B29C 64/129* (2017.08);
  (Continued)

(58) Field of Classification Search
  CPC .... B29C 64/124; B29C 64/129; B29C 64/135
  (Continued)

(56) References Cited

U.S. PATENT DOCUMENTS

| 5,122,441 A | 6/1992 | Lawton et al. |
| 5,391,314 A * | 2/1995 | Minemura ......... C10M 171/001 252/572 |

(Continued)

FOREIGN PATENT DOCUMENTS

WO 2016/140886 A1 9/2016

OTHER PUBLICATIONS

Sangermano et al., "Fluorinated alcohols as surface-active agents in cationic photopolymerization of epoxy monomers", J. Polym. Sci. Part A: Polym. Chem., vol. 43, No. 18, Sep. 15, 2005, pp. 4144-4147.

*Primary Examiner* — Leo B Tentoni
(74) *Attorney, Agent, or Firm* — Witham & Cook, P.C.

(57) ABSTRACT

A system for printing three dimensional objects using a liquid-matrix support includes a motor, a resin, a stage, oil, and a light projecting source. The motor is an operating interface that is adapted to move the stage in an upward or in a downward direction. The resin in the system comprises a light polymerizable liquid. The light from the light projecting source is projected onto the resin to provide a shape to the three dimensional objects. The stage is adapted to move in the upward or in the downward direction to support the growing layers of the printed three dimensional objects. The oil is a non-aqueous hydrophobic and oleo-phobic component that is coupled at an interface with the resin by a liquid-matrix support which includes an additive. The light projecting irradiates the resin, and, in a preferred embodiment, irradiation passes through the oil to the resin. The liquid-matrix support enhances speed, resolution and provides smooth finishing texture to the printed three dimensional objects of large and small dimensions.

4 Claims, 2 Drawing Sheets

Related U.S. Application Data

(60) Provisional application No. 62/418,365, filed on Nov. 7, 2016.

(51) Int. Cl.
| | |
|---|---|
| *B29C 64/129* | (2017.01) |
| *B33Y 70/00* | (2015.01) |
| *B33Y 10/00* | (2015.01) |
| *B29C 64/124* | (2017.01) |
| *B33Y 30/00* | (2015.01) |
| *B29C 64/135* | (2017.01) |
| *C09D 133/04* | (2006.01) |
| *C09D 135/02* | (2006.01) |
| *C09D 163/00* | (2006.01) |
| *C09D 175/04* | (2006.01) |
| *C09D 191/00* | (2006.01) |

(52) U.S. Cl.
CPC ............ *B29C 64/135* (2017.08); *B33Y 10/00* (2014.12); *B33Y 30/00* (2014.12); *B33Y 70/00* (2014.12); *C09D 133/04* (2013.01); *C09D 135/02* (2013.01); *C09D 163/00* (2013.01); *C09D 175/04* (2013.01); *C09D 191/00* (2013.01)

(58) Field of Classification Search
USPC .................................................. 264/298, 401
See application file for complete search history.

(56) References Cited

U.S. PATENT DOCUMENTS

| | | | |
|---|---|---|---|
| 2005/0215744 A1* | 9/2005 | Wiese | B29C 64/112 526/319 |
| 2015/0152270 A1 | 6/2015 | Aizenberg et al. | |
| 2016/0046075 A1 | 2/2016 | DeSimone et al. | |
| 2016/0160077 A1 | 6/2016 | Rolland et al. | |
| 2016/0193786 A1* | 7/2016 | Moore | B29C 64/129 425/162 |
| 2017/0174932 A1* | 6/2017 | Granlund | B29C 64/118 |

* cited by examiner

METHOD FOR THREE DIMENSIONAL PRINTING

CROSS-REFERENCE TO RELATED APPLICATIONS

This application is a continuation of PCT/US2017/060127 filed Dec. 21, 2017.

BACKGROUND

Technical Field

The embodiments herein generally relate to printing of three dimensional objects using a liquid-matrix support, and, more particularly, a system for printing the three dimensional objects using the liquid-matrix support.

Description of the Related Art

Step-wise or layer-by-layer or sequential three-dimensional object building was the first technique adopted for three-dimensional manufacturing techniques. The three-dimensional manufacturing techniques are largely referred as three dimensional printing or additive manufacturing. Additionally, the above-mentioned techniques are based on the solidification of a liquid resin that is referred to as a photo curable technique. The photo curable technique comprises an initiator material that is mainly UV or near-UV active that generates free-radicals that initiates the polymerization of the resin resulting in networking among the resin molecules.

Solidification of the liquid resin is also referred as curing, which occurs throughout a top-to-bottom or a bottom-to-top printing depending on the technology used. The liquid resin polymerizes in such a way to obtain an additional layer to be built on the surface of the growing object by a light irradiation sequence.

In top-to-bottom printing, layers of the cured resin are formed at the top surface of the growing object, followed by a lowering of the printed model into the resin for a new layer of cured resin to be added after the irradiation step. The main disadvantage of the top-to-bottom 3D-printing technique is the fact that the model being printed has to be submerged in the resin deeper and deeper after every layer 3D-printing. Hence, this limits the top-to-bottom 3D-printing technique to a height and/or total size of the model which is limited by the volume of resin. U.S. Pat. No. 5,236,637 to Hull details about a stereo lithographic system for automatic generation of three-dimensional objects on a layer-by-layer basis by alternately forming layers of medium over previously formed layers of the object. Further, the Hull also describes selectively solidifying successive layers of medium at a surface of a body of the medium whereby the object is formed from a plurality of solidified and adhered layers. A limitation to the Hull technique is that it involves full immersion of the object in the resin which can constitute some mechanical constraints with respect to the size of the three-dimensional object to be produced.

In the bottom-to-top 3D-printing technique, the need to use deep wells of resin for 3D-printing "tall" models is eliminated. The bottom-to-top 3D-printing technique requires only relatively shallow well or pool of resin is used. The main limiting factor is the so-called separation step that is needed, since upon the curing of each layer, the printed model must be separated carefully from a bottom plate in the fabrication well. Often this requires additional mechanical components and steps due to physical and chemical interactions between the printed model the bottom plate. In U.S. Pat. No. 7,438,846 to John an elastic gel separating layer is arranged between the bottom plate and the model in order to separate "undestructively" the solidified material from the plate. U.S. Pat. Application No. 2013/0292862 to Joyce describes devices, methods, and computer program products for facilitating the assembly of three-dimensional parts in a layer-wise fashion. Joyce describes separation forces between the assembler device and polymers, photopolymers and metals being minimized at certain interfaces by the utilization of a cure inhibiting layer on a top surface of the image plate and by sliding the part from contact with a portion of the image plate having high elevation to above a portion of the image plate with low elevation. A three-dimensional object may be produced in cascaded layers from a liquid resin that solidifies upon exposure to light. A translation stage may be positioned relative to a vat that is suitable for solidifying the highest un-solidified layer of the three-dimensional object directly beneath any existing, solidified layers of the three-dimensional object.

U.S. Pat. Application No. 2013/0295212 to Chen discloses a mask image projection system that may project a two-dimensional image of the highest un-solidified layer through a transparent bottom of the vat and into the liquid resin. Chen also describes allowing the liquid resin to solidify in the shape of the two-dimensional image and allowing it to adhere to the bottom of a surface beneath the solidified layer. Recently, Carbon3D, Inc. of Redwood City, Calif. (see U.S. Pat. No. 9,205,601 to DeSimone and U.S. Pat. No. 9,211,678 to DeSimone) introduced the Continuous Liquid Interphase Printing (CLIP) method, wherein an optically transparent film (such as Teflon AF®) that is oxygen permeable is used. The oxygen acts as a polymerization inhibitor of the resin and thus maintains a dead zone of the polymerizable liquid in contact with the build surface. While such a method would eliminate the separation ("peeling") step and the use of a mechanical step to accomplish this, it complicates the whole method of 3D-printing at both the software and hardware levels since the control of the amount of oxygen (the inhibitor) in the described dead zone is accomplished by oxygen sensors and feedback from the software. In addition, the film which is used is made by extrusion methods and thus its width is size limited by the process and consequently only small models (width wise) may be printed.

An additional limitation in the currently used building plates in the bottom-to-top DLP 3D-printing technique is the size of the vat. Large solid supporting plates used in the process are difficult to level due to the weight of the resin and hence distortion in the printed model often results. This is a significant problem when the build plate is made of a malleable membrane such as Teflon AF (WO Pat. No. 2016/025579 to DeSimone) or PDMS based sheets (U.S. Pat. No. 7,438,846 to John).

In some prior art references (see, e.g., US Patent App. 2013/0295212 to Chen, US Patent App. 2013/0292862 to Joyce, U.S. Pat. No. 8,905,739 to Vermeer, U.S. Pat. No. 9,486,964 to Joyce and U.S. Pat. No. 9,034,237 to Sperry), a mechanical step is introduced for the separation process and may complicate the apparatus, slow the method, and/or potentially distort the end product. In addition, this may also have negative effects on the resolution and speed of the print.

The various prior art references discussed above disclose different approaches that may introduce a mechanical step in the process of three dimensional printing. Introduction of mechanical step complicates the system to be used in the three dimensional printing, slows down the process, and often distorts the end product. Additionally, solid-liquid interface used in these three-dimensional printing systems can result in weaknesses in terms of end-product distortion and delays 3D-printing speeds related to the solidification duration of the liquid resin, in addition to wearing out with time. Moreover, many of the bottom-to-top DLP printing techniques are limited to the size of the building plate due to the property of the plate material used (malleable and/or of small size).

Accordingly, there is a need for improved methods and systems for printing three dimensional objects.

SUMMARY

Aspects of the invention pertain to a system for printing of three dimensional objects using a liquid-matrix support. In an embodiment, the system comprises a motor, a resin, a stage, oil, and a light projecting source. The motor and the stage are connected in manner whereby the motor is adapted to move the stage in an upward or a downward direction. The resin is a light polymerizable liquid. A light from the light projecting source is projected on the resin to provide a shape to the three dimensional objects. The stage is adapted to move in the upward or in the downward direction to support the growing layers of the printed three dimensional objects upon irradiation by light (radiant energy (e.g., UV, Vis, IR, microwaves)) from the light projecting source. The oil is a non-aqueous hydrophobic and oleo-phobic component and is layered below the resin. The light projecting source is configured to accomplish the irradiation process.

In an embodiment, the liquid-matrix support in the system is a liquid bilayer made of immiscible oil, a resin, and an additive there between. In another embodiment, the oil in the liquid-matrix support provides a liquid support for the resin. In another embodiment, the resin comprises polymerizable liquids (such as acrylates, urethanes, epoxies, etc.) and additives. The resin may be selected from a group of combinations of mono-acrylate, di-acrylate, tri-acrylate, tetra-acrylates, poly-acrylate, urethanes, poly-urethanes, epoxy and/or their oligomers. The additives in the liquid-matrix support are represented by the formula Rf—X—R. Rf represents per fluorinated alkyl groups such as $CF_3(CF_2)n$-, $CF_3(OCF_2CF_2)_n$—, $CF_3(OCF_2CF_2CF_2)_n$—, $CF_3[CF(CF_3)-CF_2-O]_n$— where n=1 to 30. X represents any chemical linkage group from the family of ethers, esters, amides or a single bond bonding together Rf and R. In the case of the ethers and esters, the ether or ester will have two to thirty carbons and at least one oxygen in the case of an ether and at least one oxygen and one carbonyl moiety in the case of an ester. In the case of an amide the chemical linkage will have one to thirty carbons and at least one carbonyl-amino moiety. R represents a non-fluorinated alkyl, alkenyl, alkynyl, or aryl groups with or without functional groups such as alcohols, amines, ethers or polyethers, esters, amides, etc. (e.g., R may be substituted with alkyls such as methyls, ethyls and other alkyls; one or more amino groups; cyano groups; sulfur containing moieties; halogens; oxygen containing moieties (e.g., hydroxyls); ethers; and esters, with the primary requirement being that R is not fluorinated). The arrangement of Rh—X—R has fluorinated moieties and non-fluorinated moieties at opposite ends of the molecule. One or more different additives can be used in the resin.

In an embodiment, the oil is selected from aliphatic and polymeric perfluorinated compounds represented from $CF_3(CF_2)n$-, $CF_3(OCF_2CF_2)_n$—, $CF_3(OCF_2CF_2CF_2)_n$—, $CF_3[CF(CF_3)-CF_2-O]_n$— with the value of 'n' from 10 to 100. In another embodiment, the oil is selected from the group, but not limited to, Krytox oil-103, Krytox oil-104, Krytox oil-105, Krytox oil-106, Krytox oil-107, Krytox oil XHT oils (Dupont®), Demnum oils (Daikin®), Dyneon oils (3M®), fluorinert FC-70 (3M®), (perfluorodecalin, Perfluoroperhydrophenanthrene, Perfluoromethyldecalin, or Perfluoroperhydrobenzyltetralin.

In another embodiment, the liquid-matrix support in the system decreases the surface tension of the resin in the printed three dimensional objects. In further embodiments, the liquid-matrix support decreases interaction of the printed three dimensional objects with the oil while the stage moves in the upward direction. In another embodiment, the liquid-matrix support in the system increases the "surface energy" of the oil in order to increase the oil's wetting by the resin.

In one embodiment, the resin in the liquid-matrix support is adapted to quickly cure while printing the three dimensional objects. In another embodiment, the additives work at the liquid-matrix interface of the resin and the oil to provide a smooth texture of the printed three dimensional objects. In another aspect, the liquid-matrix support enables printing at speeds up to 20-30 mm/min for the printing of the three dimensional objects while maintaining high resolution of the finished product.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following embodiments. Description of well-known components and processing techniques are omitted so as to not obscure the embodiments herein. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

Figure 1:
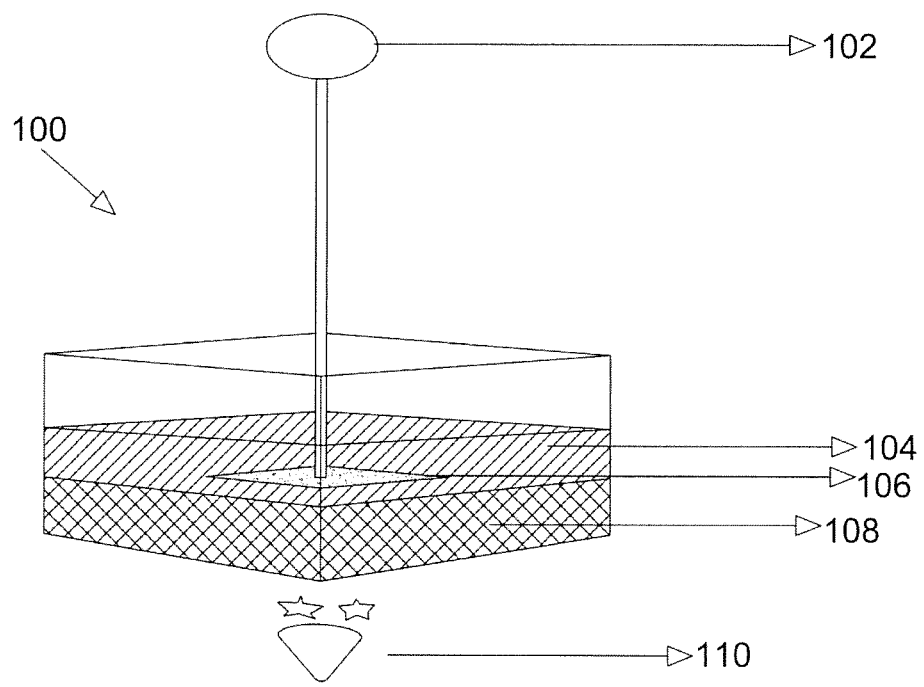
FIG. 1 is a schematic of a system for printing the three dimensional objects according to an embodiment herein.
Figure 2:
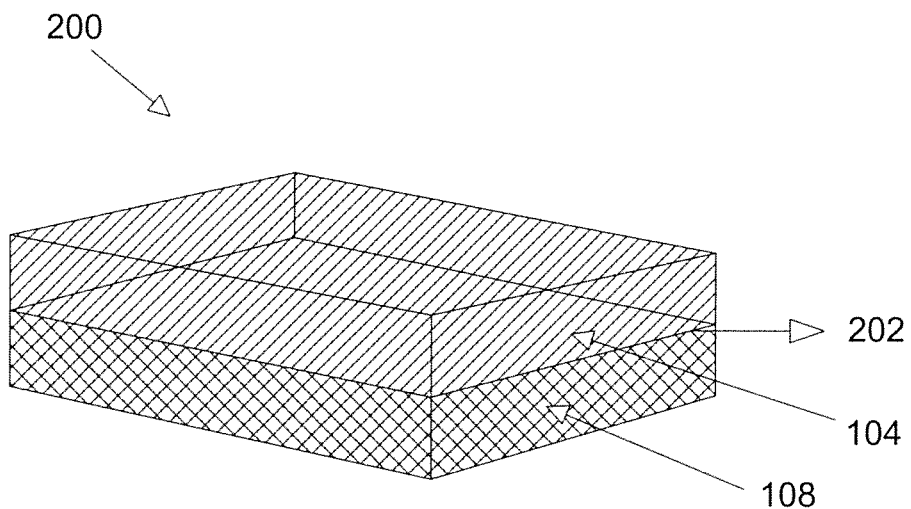
FIG. 2 is a perspective view of the liquid-matrix support in the system for printing the three dimensional objects according to an embodiment herein.
Figure 3:
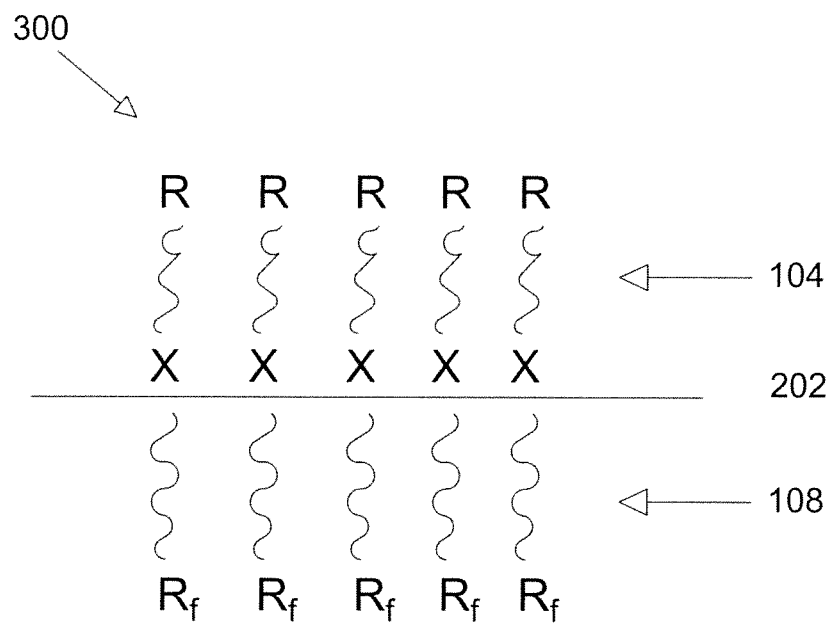
FIG. 3 illustrates a diagrammatic view of the additive orientation at the liquid-matrix interface of FIG. 2 in the system for printing the three dimensional objects according to an embodiment herein.

As mentioned, there remains a need for a system for printing the three dimensional objects using a method that enhances speed of printing of three dimensional objects, large sizes of three dimensional objects, and with high resolution and smooth finishing texture to the three dimensional objects. The embodiments herein achieve this by providing a system that comprises a liquid-matrix that works as a non-sticking support and ensures high quality texture and high 3D-printing speeds. Referring now to the drawings, and more particularly to FIGS. 1 through 3, where similar reference characters denote corresponding features consistently throughout the figures, there are shown preferred embodiments.

FIG. 1 illustrates a perspective view of a system 100 for printing three dimensional objects using a liquid-matrix support according to an embodiment herein. The system 100 includes a motor 102, a resin 104, a stage 106, oil 108, and a light projecting source 110. The motor 102 is adapted to move the stage 106 in an upward or in a downward direction. The resin 104 is light polymerizable. The light from the light projecting source 110 is projected onto the resin 104 to provide a shape for the three dimensional objects. In an embodiment, the stage 106 is immersed in a layer of the resin 104. In another embodiment, the stage 106 is adapted to support the growing layers of the three dimensional object printed by the system 100. In one embodiment, the oil 108 comprises a non-aqueous hydrophobic and oleo-phobic component. In another embodiment, the oil 108 is layered below the resin 104 and provides a liquid support for the resin 104. In another embodiment, the oil 108 does not interfere with the irradiated light. In another embodiment, the light projecting source 110 is configured to accomplish irradiation process by projecting the light on the resin 104. In one embodiment, the light projecting source 110 is, but not limited to, a UV light emitting diode (LED) or digital light processing equipment. In another embodiment, the light projecting source 110 is operated by a mercury lamp and results in high output of UV light of appropriate wavelength. In another embodiment, the mercury lamp is configured for initiation of the polymerization process based on polymerizing initiators added to the resin 104. In an embodiment, the liquid-matrix support in the system 100 is a liquid bi-layer made of immiscible oil 108, the resin 104 and an additive there between.

FIG. 2 illustrates a perspective view 200 of the liquid-matrix support 202 of FIG. 1 according to an embodiment herein. The resin 104 and the oil 108 are adapted to layer with each other at the liquid-matrix support 202. In one embodiment, the resin 104 is formulated to include additives for printing three dimensional objects. In one embodiment, the resin 104 includes acrylates that are selected from the group comprising of mono acrylates, di-acrylates, tri-acrylates, tetra-acrylates, urethanes, epoxy resins, oligomers or a combination of thereof. In another embodiment, the additives at the liquid-matrix support 202 are included from an amphiphilic family of compounds. In another embodiment, the additives are comprised from the formula—'Rf—X—R'. 'Rf' comprises per fluorinated alkyl groups selected from alkyl group comprising of $CF_3(CF_2)n-$, $CF_3(OCF_2CF_2)_n-$, $CF_3(OCF_2CF_2CF_2)_n-$, $CF_3[CF(CF_3)-CF_2-O]_n-$. The value of 'n' in 'Rf' is selected from the range of 1-30. 'X' comprises a linkage group selected from ethers, amides, esters or a single bond connecting Rf and R. 'R' is selected from non-fluorinated alkyl, alkenyl, alkynyl, or aryl groups with or without functional groups such as alcohols, amines, ethers or polyethers, esters, or amides.

In another embodiment, the oil 108 includes, but not limited to, Krytox oil-103, Krytox oil-104, Krytox oil-105, Krytox oil-106, Krytox oil-107, Krytox oil XHT (Dupont®), Demnum S-20, Demnum S-65, Demnum S-200 (Daikin®), Dyneon oils (3M®), fluorinert FC-70 (3M®), perfluorodecalin, Perfluoroperhydrophenanthrene, Perfluoromethyldecalin, or Perfluoroperhydrobenzyltetralin.

In another embodiment, the liquid-matrix support 202 is adapted to decrease the surface tension of the resin 104 in the printed three dimensional objects. In another embodiment, the liquid-matrix support 202 is adapted to decrease interaction of printed three dimensional objects with the oil 108 during the upward movement of the stage 106. In another aspect, the resin 104 is adapted for fast curing of the printed three dimensional objects. In another embodiment, the additives work at the liquid-matrix support 202 at the interface of the resin 104 and the oil 108 to increase the surface energy of the latter. In another embodiment, the additives work at the liquid-matrix support 202 at the interface of the resin 104 and the oil 108 to increase the wetting of the resin 104 on the oil 108 surface. In another embodiment, the additives work at the liquid-matrix support 202 at the interface of the resin 104 and the oil 108 causes the creation of a smooth texture of the printed three dimensional objects.

In an embodiment illustrated in FIG. 1, the stage 106 is adapted to move in the upward direction from the liquid-matrix support 202 (shown in FIG. 2) and continues the movement until the resin 104 solidifies to provide shape to the printed three dimensional objects in a sequential or non-sequential movement. In another embodiment, the 3D-printing method is configured to provide a speed of up-to 30 mm/min for printing the three dimensional objects. In alternative embodiments, the motor 102 may move the stage in downwardly towards the interface between the oil 108 and resin 104 (i.e., the liquid-matrix support 202), or both upwardly and downwardly depending on the application. The volume shown in blank above the resin 104 can accommodate additional resin which can be added before or during formation of the 3D object.

FIG. 3 illustrates a diagrammatic view 300 of the additive orientation at the liquid-matrix support 202 of FIG. 2 according to an embodiment herein. The additive orientation is adapted in a manner that 'Rf' is downwardly embedded in the oil 108. 'X' of the additives is embedded upwardly in a linkage with 'R' towards the resin 104. In an embodiment, the additive orientation, is adapted to decrease the interaction of the three dimensional printed object with the oil 108 when the stage 106 moves up. In an embodiment, the additive orientation decreases the surface tension of the resin 104 at the liquid-matrix support 202. In an embodiment, the additive orientation increases the surface energy of the oil 108 at the liquid-matrix support 202. The decrease in the interaction of the three dimensional printed objects with the oil 108, the increase of surface energy at the liquid-matrix interface 202, the increase in the wettability of the oil 108 by the resin 104, and the decrease in the surface tension of the resin 104 at the liquid-matrix interface 202 improve the texture of the printed three dimensional objects and allow for high 3D-printing speeds.

In an embodiment, the perfluorinated oil comprise short aliphatic repeating units and polymeric repeating units selected from the group comprising of $CF_3(CF_2)n-$, $CF_3(OCF_2CF_2)_n-$, $CF_3(OCF_2CF_2CF_2)_n-$, $CF_3[CF(CF_3)-CF_2-O]_n-$, where n=10 to 100. In another embodiment, the oil 108 that is layered below the resin 104 and the liquid-matrix support 202 is optically clear. The oil 108 is adapted with a kinematic viscosity of at least 75-95 centistokes at 20° C.-30° C., preferably higher than 500 centistokes at 20° C.-30° C. In another embodiment, the boiling point of the oil 108 is at least 150° C.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for three-dimensional printing, comprising the steps of:
    layering a light polymerizable resin on top of an oil that is a non-aqueous hydrophobic and oleo-phobic component, wherein the light polymerizable resin is mixed with an additive that includes both fluorinated moieties and nonfluorinated moieties at opposite ends of a molecule, wherein the layering step produces a resin layer on top of an oil layer with a liquid-matrix support at the interface of the resin layer and the oil layer, wherein the fluorinated moieties of the additive contact or project into the oil layer and the non-fluorinated moieties of the additive contact or project into the resin layer;
    irradiating the resin layer in a manner which polymerizes portions of the resin layer exposed to radiant energy;
    moving a stage in the resin layer relative to the interface, wherein the stage supports growing layers of polymeric material formed in response to the irradiating step; and
    repeating the irradiating and moving steps a plurality of times.

2. The method of claim 1 wherein irradiating is achieved by projecting radiant energy through the oil toward the resin.

3. The method of claim 1 wherein the additive includes one or more molecules which are represented by the formula Rf-X—R where Rf is a perfluorinated alkyl group selected from the groups consisting of $CF_3(CF_2)n$-, $CF_3(OCF_2CF_2)n$-, $CF_3(OCF_2CF_2CF_2)n$-, and $CF_2[CF(CF_3)$—$CF_2$—$O]n$-, where n=1 to 30;

X is a linkage group connecting Rf and R which is either a single bond directly connecting Rf and R or a chemical linkage between Rf and R having at least one ether, ester, or amide; and R is a non-fluorinated substituted or unsubstituted alkyl, alkenyl, alkynyl, or aryl group.

4. The method of claim 1 wherein the oil is selected from group consisting of aliphatic and polymeric perfluorinated compounds selected from the group consisting of $CF_3(CF_2)n$-, $CF_3(OCF_2CF_2)n$-, $CF_3(OCF_2CF_2CF_2)n$-, and $CF_2[CF(CF_3)$—$CF_2$—$O]n$- where n=10 to 100.

* * * * *